US007203715B2

(12) United States Patent
Rizzotto et al.

(10) Patent No.: US 7,203,715 B2
(45) Date of Patent: Apr. 10, 2007

(54) METHOD AND RELATIVE QUANTUM GATE FOR RUNNING A GROVER'S OR A DEUTSCH-JOZSA'S QUANTUM ALGORITHM

(75) Inventors: Gianguido Rizzotto, Civate (IT); Paolo Amato, Limbiate (IT); Domenico Porto, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 666 days.

(21) Appl. No.: 10/615,446

(22) Filed: Jul. 8, 2003

(65) Prior Publication Data

US 2004/0059765 A1 Mar. 25, 2004

(30) Foreign Application Priority Data

Jul. 8, 2002 (EP) ................... 02425447

(51) Int. Cl.
*G06F 7/00* (2006.01)
(52) U.S. Cl. ...................... 708/200; 359/107
(58) Field of Classification Search ............... 708/200, 708/191; 359/107, 108
See application file for complete search history.

(56) References Cited

U.S. PATENT DOCUMENTS 6,317,766 B1 * 11/2001 Grover ........................ 708/400
7,069,282 B2 * 6/2006 Rizzotto et al. ............. 708/200

FOREIGN PATENT DOCUMENTS

EP 1083520 3/2001
WO 01/67186 9/2001

OTHER PUBLICATIONS

Hioe et al., A Single Flux Quantum Logic Gate with High Functionality, Superconductor Science and Technology, IOP Publishing, Techno House, Bristol, GB, vol. 4, No. 11, Nov. 1, 1991, pp. 658-661, XP000561158.
Miquel et al., Factoring in a Dissipative Quantum Computer, Physical Review, A. General Physics, American Institute of Physics, New York, US, vol. 54, No. 4, Oct. 4, 1996, pp. 2605-2613, XP002181469.
Verdal et al., Basic of Quantum Computation, Progress in Quantum Electronics, Pergamon Press, Oxford, GB, vol. 22, Feb. 1998, pp. 1-39, XP000937713.

* cited by examiner

*Primary Examiner*—Tan V. Mai
(74) *Attorney, Agent, or Firm*—Lisa K. Jorgenson; Allen, Dyer, Doppelt, Milbrath & Gilchrist, P.A.

(57) ABSTRACT

A method of performing a Grover's or a Deutsch-Jozsa's quantum algorithm being input with a binary function defined on a space having a basis of vectors of n of qubits includes carrying out a superposition operation over input vectors for generating components of linear superposition vectors referred to a second basis of vectors of n+1 qubits. An entanglement operation is performed over components of the linear superposition vectors for generating components of numeric entanglement vectors. The method allows a non-negligible time savings because the entanglement operation does not multiply a superposition vector for an entanglement matrix, but generates components of an entanglement vector simply by copying or inverting respective components of the superposition vector depending on values of the binary function. An interference operation is performed over components of the numeric entanglement vectors for generating components of output vectors.

18 Claims, 8 Drawing Sheets

METHOD AND RELATIVE QUANTUM GATE FOR RUNNING A GROVER'S OR A DEUTSCH-JOZSA'S QUANTUM ALGORITHM

FIELD OF THE INVENTION

The present invention relates to quantum algorithms, and more precisely, to a method for performing a Grover's or a Deutsch-Jozsa's quantum algorithm and a corresponding quantum gate.

BACKGROUND OF THE INVENTION

Quantum search algorithms are global random searching algorithms based on the principles, laws and effects of quantum mechanics. They are used for controlling a process or for processing data in a database, and more specifically, for controlling a process that may include search-of-minima intelligent operations.

In a quantum search, each design variable is represented by a finite linear superposition of initial states, with a sequence of elementary unitary steps manipulating the initial quantum state (for the input) such that a measurement of the final state of the system yields the correct output. Usually, three principle operators, i.e., linear superposition (coherent states), entanglement and interference are used in the quantum search algorithm.

For a better understanding, a brief description of quantum search algorithms is provided. The problems solved by quantum algorithms may be stated as follows:

| Input | A function f: $\{0,1\}^n \to \{0,1\}^m$ |
| Problem | Find a certain property of f |

The structure of a quantum algorithm is outlined by a high level representation in the schematic diagram of FIG. 1.

The input of a quantum algorithm is a function f from binary strings into binary strings. This function is represented as a map table, which defines for every string its image. Function f is first encoded into a unitary matrix operator $U_F$ depending on f properties. This operator calculates f when its input and output strings are encoded into canonical basis vectors of a Complex Hilbert Space: $U_F$ maps the vector code of every string into the vector code of its image by f.

---

BOX 1: UNITARY MATRIX $U_F$

A squared matrix $U_F$ on the complex field is unitary if its inverse matrix coincides with its conjugate transposition:

$$U_F^{-1} = U_F^*$$

A unitary matrix is always reversible and preserves the norm of vectors.

---

When the matrix operator $U_F$ has been generated, it is embedded into a quantum gate G, a unitary matrix whose structure depends on the form of matrix $U_F$ and on the problem to be solved. The quantum gate is the core of a quantum algorithm. In every quantum algorithm, the quantum gate acts on an initial canonical basis vector (the same vector may always be chosen) to generate a complex linear combination (called a superposition) of basis vectors as the output. This superposition contains all the information to answer the initial problem.

After this superposition has been created, a measurement takes place to extract this information. In quantum mechanics, measurement is a non-deterministic operation that produces as output only one of the basis vectors. The probability of every basis vector being the output of a measurement depends on its complex coefficient (probability amplitude) in entering a complex linear combination.

The segmental action of the quantum gate and of the measurement forms the quantum block. The quantum block is repeated k times to produce a collection of k basis vectors. In measuring a non-deterministic operation, these basis vectors would not be necessarily identical and each one of them will encode a piece of the information needed to solve the problem.

The last part of the algorithm includes interpretation of the collected basis vectors to get the right answer for the initial problem with a certain probability.

The behavior of the encoder block is described in the detailed schematic diagram of FIG. 2. Function f is encoded into matrix $U_F$ in three steps.

Step 1: The map table of function f: $\{0,1\}^n \to \{0,1\}^m$ is transformed into the map table of the infective function F: $\{0,1\}^{n+m} \to \{0,1\}^{n+m}$ such that:

$$F(x_0, \ldots, x_{n-1}, y_0, \ldots, y_{m-1}) = (x_0, \ldots, x_{n-1}, f(x_0, \ldots, x_{n-1}) \oplus (y_0, \ldots, y_{m-1})) \quad (1)$$

---

BOX 2: XOR OPERATOR $\oplus$

The XOR operator between two binary strings p and q of length m is a string s of length m such that the i-th digit of s is calculated as the exclusive OR between the i-th digits of p and q:

$$p = (p_0, \ldots, p_{n-1})$$
$$q = (q_0, \ldots, q_{n-1})$$
$$s = p \oplus q = ((p_0 + q_0) \bmod 2, \ldots, (p_{n-1} + q_{n-1}) \bmod 2))$$

---

The need to deal with an injective function comes from the requirement that $U_F$ is unitary. A unitary operator is reversible, so it cannot map two different inputs in the same output. Given that $U_F$ is the matrix representation of F, F is supposed to be infective. If the matrix representation of function f is directly used, a non-unitary matrix could be obtained since f could be non-injective. So, injectivity is fulfilled by increasing the number of bits and considering function F instead of function f. Function f can always be calculated from F by putting $(y_0, \ldots, y_{m-1}) = (0, \ldots, 0)$ in the input string and reading the last m values of the output string.

Step 2: Function F map table is transformed into a $U_F$ map table, based upon the following constraint:

$$\forall s \in \{0,1\}^{n+m}: U_F[\tau(s)] = \tau[F(s)] \quad (2)$$

The code map $\tau:\{0,1\}^{n+m} \to C^{2^{n+m}}$ ($C^{2^{n+m}}$ is the target Complex Hilbert Space) is such that:

$$\tau(0) = \begin{pmatrix} 1 \\ 0 \end{pmatrix} = |0\rangle \quad \tau(1) = \begin{pmatrix} 0 \\ 1 \end{pmatrix} = |1\rangle \quad (3)$$

$$\tau(x_0, \ldots, x_{n+m-1}) = \tau(x_0) \otimes \ldots \otimes \tau(x_{n+m-1}) = |x_0 \ldots x_{n+m-1}\rangle$$

---

BOX 3: VECTOR TENSOR PRODUCT $\otimes$

The tensor product between two vectors of dimensions h and k is a tensor product of dimension h·k, such that:

$$|x\rangle \otimes |y\rangle = \begin{pmatrix} x_1 \\ \ldots \\ x_h \end{pmatrix} \otimes \begin{pmatrix} y_1 \\ \ldots \\ y_k \end{pmatrix} = \begin{pmatrix} x_1 y_1 \\ \ldots \\ x_1 y_k \\ \ldots \\ x_h y_1 \\ \ldots \\ x_h y_k \end{pmatrix} \Rightarrow$$

Physical interpretation: If a component of a complex vector is interpreted as the probability amplitude of a system in a given state (indexed by the component number), the tensor product between two vectors describes the joint probability amplitude of two systems in a joint state.

---

EXAMPLES

Vector Tensor Products $$(0,0) \xrightarrow{\tau} \begin{pmatrix} 1 \\ 0 \end{pmatrix} \otimes \begin{pmatrix} 1 \\ 0 \end{pmatrix} = \begin{pmatrix} 1 \\ 0 \\ 0 \\ 0 \end{pmatrix} = |00\rangle \quad (0,1) \xrightarrow{\tau} \begin{pmatrix} 1 \\ 0 \end{pmatrix} \otimes \begin{pmatrix} 0 \\ 1 \end{pmatrix} = \begin{pmatrix} 0 \\ 1 \\ 0 \\ 0 \end{pmatrix} = |01\rangle$$

$$(1,0) \xrightarrow{\tau} \begin{pmatrix} 0 \\ 1 \end{pmatrix} \otimes \begin{pmatrix} 1 \\ 0 \end{pmatrix} = \begin{pmatrix} 0 \\ 0 \\ 1 \\ 0 \end{pmatrix} = |10\rangle \quad (1,1) \xrightarrow{\tau} \begin{pmatrix} 0 \\ 1 \end{pmatrix} \otimes \begin{pmatrix} 0 \\ 1 \end{pmatrix} = \begin{pmatrix} 0 \\ 0 \\ 0 \\ 1 \end{pmatrix} = |11\rangle$$

Code $\tau$ maps bit values into complex vectors of dimension 2 belonging to the canonical basis of $C^2$. Besides using the tensor product, $\tau$ maps the general state of a binary string of dimension n into a vector of dimension $2^n$, for reducing this state to the joint state of the n bits composing the register. Every bit state is transformed into the corresponding 2-dimensional basis vector, and then the string state is mapped into the corresponding $2^n$-dimensional basis vector by composing all bit-vectors through tensor product. In this sense, the tensor product is the vector counterpart of a state conjunction.

Basis vectors are denoted using the ket notation $|i\rangle$. This notation is taken from the Dirac description of quantum mechanics.

Step 3: $U_F$ map table is transformed into $U_F$ using the following transformation rule:

$$[U_F]_{ij} = 1 \Leftrightarrow U_F|j\rangle = |i\rangle \quad (4)$$

which can be easily understood considering vectors $|i\rangle$ and $|j\rangle$ as column vectors. Associating these vectors to the canonical basis, $U_F$ defines a permutation map of the identity matrix rows. In general, row $|j\rangle$ is mapped into row $|i\rangle$. This rule will be illustrated in detail in an example quantum algorithm: Grover's algorithm.

The core of the quantum block is the quantum gate, which depends on the properties of matrix $U_F$. The scheme in FIG. 3 gives a more detailed description of the quantum block. The matrix operator $U_F$ in FIG. 3 is the output of the encoder block represented in FIG. 2. Here, it becomes the input for the quantum block.

This matrix operator is first embedded into a more complex gate: the quantum gate G. Unitary matrix G is applied k times to an initial canonical basis vector $|i\rangle$ of dimension $2^{n+m}$. Every time, the resulting complex superposition $G|0 \ldots 01 \ldots 1\rangle$ of basis vectors is measured, and produces one basis vector $|x_i\rangle$ as a result. All the measured basis vectors $\{|x_1\rangle, \ldots, |x_k\rangle\}$ are collected together. This collection is the output of the quantum block.

The intelligence of such algorithms is in the ability to build a quantum gate that is able to extract the information necessary to find the required property of f and to store it into the output vector collection. The structure of the quantum gate for every quantum algorithm will be discussed in detail, observing that a general description is possible. To represent quantum gates some special diagrams called quantum circuits are going to be used.

An example of a quantum circuit, relative to the so called Deutsch-Jozsa's quantum algorithm, is illustrated in FIG. 4. Every rectangle is associated to a $2^n \times 2^n$ matrix, where n is the number of lines entering and leaving the rectangle. For example, the rectangle marked $U_F$ is associated to matrix $U_F$. Typically, matrix H represents a Hadamard rotation:

$$H = \frac{1}{\sqrt{2}} \begin{bmatrix} 1 & 1 \\ 1 & -1 \end{bmatrix} \quad (5)$$

Quantum circuits provide a high-level description of the gate, and using some of the transformation rules are listed in FIGS. 5A–5F it is possible to compile them into the corresponding gate-matrix.

---

BOX 4: MATRIX TENSOR PRODUCT $\otimes$

The tensor product between two matrices $X_{n \times m}$ and $Y_{h \times k}$ is a (block) matrix $(n \cdot h) \times (m \cdot k)$ such that:

$$X \otimes Y = \begin{bmatrix} x_{11} Y & \ldots & x_{1m} Y \\ \ldots & \ldots & \ldots \\ x_{n1} Y & \ldots & x_{nm} Y \end{bmatrix} \text{ with } X = \begin{bmatrix} x_{11} & \ldots & x_{1m} \\ \ldots & \ldots & \ldots \\ x_{n1} & \ldots & x_{nm} \end{bmatrix}$$

---

EXAMPLE

Matrix Tensor Product:

$$\begin{bmatrix} 1 & 2 \\ 3 & 4 \end{bmatrix} \otimes \begin{bmatrix} 5 & 6 \\ 7 & 8 \end{bmatrix} = \begin{bmatrix} 1 \cdot \begin{bmatrix} 5 & 6 \\ 7 & 8 \end{bmatrix} & 2 \cdot \begin{bmatrix} 5 & 6 \\ 7 & 8 \end{bmatrix} \\ 3 \cdot \begin{bmatrix} 5 & 6 \\ 7 & 8 \end{bmatrix} & 4 \cdot \begin{bmatrix} 5 & 6 \\ 7 & 8 \end{bmatrix} \end{bmatrix}$$

-continued $$= \begin{bmatrix} 5 & 6 & 10 & 12 \\ 7 & 8 & 14 & 16 \\ 15 & 18 & 20 & 24 \\ 21 & 24 & 28 & 32 \end{bmatrix}$$

It will be clearer how to use these rules when the first example of a quantum algorithm will be discussed in greater detail below.

The decoder block has the function to interpret the basis vectors collected after the iterated execution of the quantum block. Decoding these vectors means to retranslate them into binary strings and interpreting them directly if they already contain the answer to the starting problem or use them, for instance as coefficients vectors for an equation system, in order to get the searched solution. This part will not be investigated in detail because it is relatively straightforward to understand by those skilled in the art.

Because of the particular importance of the Grover's quantum algorithm in the realization of controllers and of data search algorithms in databases, a brief description of the Grover's algorithm is given. Grover's problem is stated as follows:

| Input | A function f: $\{0, 1\}^n \rightarrow \{0, 1\}$ such that $\exists x \in \{0, 1\}^n$: $(f(x) = 1 \wedge \forall y \in \{0, 1\}^n: x \neq y \Rightarrow f(y) = 0)$ |
|---|---|
| Problem | Find x |

In Deutsch-Jozsa's algorithm there are two classes of input functions and it must be determined what class the input function belonged to. In this case the problem is almost identical in its form, even if it is more difficult because now we are dealing with $2^n$ classes of input functions (each function of the kind described forms a class).

The diagram of the Grover's algorithm is depicted in FIG. 6, and the gate equation is as follows:

$$\Phi = [(D_n \otimes I) \cdot U_F]^h \cdot {}^{(n+1)}H \quad (6)$$

Operator $D_n$ is called a diffusion matrix of order n and it is responsible for interference in this algorithm. This matrix is defined as follows:

| $D_n$ | $\|0\ldots0\rangle$ | $\|0\ldots1\rangle$ | $\ldots$ | $\|i\rangle$ | $\ldots$ | $\|1\ldots0\rangle$ | $\|1\ldots1\rangle$ |
|---|---|---|---|---|---|---|---|
| $\|0\ldots0\rangle$ | $-1 + 1/2^{n-1}$ | $1/2^{n-1}$ | $\ldots$ | $1/2^{n-1}$ | $\ldots$ | $1/2^{n-1}$ | $1/2^{n-1}$ |
| $\|0\ldots1\rangle$ | $1/2^{n-1}$ | $-1 + 1/2^{n-1}$ | $\ldots$ | $1/2^{n-1}$ | $\ldots$ | $1/2^{n-1}$ | $1/2^{n-1}$ |
| $\ldots$ | $\ldots$ | $\ldots$ | $\ldots$ | $\ldots$ | $\ldots$ | $\ldots$ | $\ldots$ |
| $\|i\rangle$ | $1/2^{n-1}$ | $1/2^{n-1}$ | $\ldots$ | $-1 + 1/2^{n-1}$ | $\ldots$ | $1/2^{n-1}$ | $1/2^{n-1}$ |
| $\ldots$ | $\ldots$ | $\ldots$ | $\ldots$ | $\ldots$ | $\ldots$ | $\ldots$ | $\ldots$ |
| $\|1\ldots0\rangle$ | $1/2^{n-1}$ | $1/2^{n-1}$ | $\ldots$ | $1/2^{n-1}$ | $\ldots$ | $-1 + 1/2^{n-1}$ | $1/2^{n-1}$ |
| $\|1\ldots1\rangle$ | $1/2^{n-1}$ | $1/2^{n-1}$ | $\ldots$ | $1/2^{n-1}$ | $\ldots$ | $1/2^{n-1}$ | $-1 + 1/2^{n-1}$ |

Grover's algorithm may be implemented in routines for searching a desired item in a set, by representing in vector form each item of the set forming an input set of vectors, and by applying a Grover's algorithm to this set of vectors. The output vector represents the desired item.

The implementation of a Grover's algorithm clearly implies the calculation of several vector products. In fact, all qubits must be multiplied by matrix H, then by the entanglement matrix $U_F$ and all qubits but the latter must be multiplied by matrix $D_n$.

These multiplications could be carried out via software, but it is quite-evident that the number of qubits of a quantum algorithm could be very critical in terms of computational speed. In fact, referring to the scheme in FIG. 6, the addition of only one qubit doubles the dimensions of the matrices. Thus, the number of elements (and of products) increases exponentially.

A method of performing the superposition operation of a Grover's or of a Deutsch-Jozsa's quantum algorithm over an input set of vectors is disclosed in European patent application EP01830383.4, which is assigned to the current assignee of the present invention. This method exploits the fact that any rotated vector obtained performing the Hadamard rotation (on an input vector) contemplated by the superposition operation of these quantum algorithms can be easily encoded in a binary vector. Therefore, the successive tensor product of the rotated vectors for generating linear superposition vectors can be carried out by logic gates. This fact allows a noticeable time saving because logic gates are very fast.

However, this is not sufficient to significantly speed up these quantum algorithms because the entanglement matrix $U_F$ is a $2^{n+1} \times 2^{n+1}$ square matrix, which implies a considerable computational weight both in the Grover's algorithm as well as in the Deutsch-Jozsa's algorithm.

SUMMARY OF THE INVENTION

An object of the present invention is to provide a method and a corresponding quantum gate for increasing the speed of performing entanglement operations in a Deutsch-Jozsa's or a Grover's quantum algorithm.

A large number of multiplications required by the entanglement operation gives a null result because only one component per row of the entanglement matrix $U_F$ is not a null. The entanglement operation generates an entanglement vector by permuting or not permuting a couple of opposite components of a linear superposition vector. This is dependent on the value assumed by the function f(.). More specifically, if function f(.) is null in correspondence to the vector identified by the first (leftmost) n qubits in common with the two n+1 qubit vectors to which a couple of opposite components of which the superposition vector is referred to, then the corresponding couple of components of the entanglement vector is equal to that of the superposition vector. Otherwise, it is the opposite.

Therefore, it is not necessary to calculate the entanglement matrix $U_F$ to generate an entanglement vector from a superposition vector. It is sufficient to copy or invert components of a superposition vector to generate corresponding components of an entanglement vector depending on the values of the function f(.) processed by the quantum algorithm.

More precisely, the object of the present invention is to provide a method of performing a Grover's or a Deutsch-Jozsa's quantum algorithm using a certain binary function defined on a space having a basis of vectors of n of qubits. The method may comprise carrying out a superposition operation over input vectors for generating components of linear superposition vectors referred on a second basis of vectors of n+1 qubits, carrying out an entanglement operation over components of the linear superposition vectors for generating components of numeric entanglement vectors, and carrying out an interference operation over components of the numeric entanglement vectors for generating components of output vectors.

The method allows a non-negligible time saving because the entanglement operation is carried out by generating, for components of each superposition vector, corresponding components of a numeric entanglement vector. Each component referred to a respective vector of the second basis is equal to the corresponding component of the respective superposition vector if the binary function is null in correspondence to the vector of the first basis formed by the first n qubits of the respective vector of the second basis; or the opposite of the corresponding component of the respective superposition vector if the binary function is not a null in correspondence to the vector of the first basis formed by the first n qubits of the respective vector of the second basis.

This method can be implemented in a quantum gate for running a Grover's or a Deutsch-Jozsa's quantum algorithm using a certain binary function defined on a space having a basis of vectors of n of qubits. The quantum gate may comprise a superposition subsystem carrying out a superposition operation over components of input vectors for generating components of linear superposition vectors referred on a second basis of vectors of n+1 qubits. An entanglement subsystem carries out an entanglement operation over components of the linear superposition vectors for generating components of numeric entanglement vectors. An interference subsystem carries out an interference operation over components of the numeric entanglement vectors for generating components of output vectors.

The entanglement subsystem may comprise a command circuit generating a number ($2^n$) of logic command signals encoding the values of the binary function in correspondence to the vectors of the first basis. Circuit means may be input with the logic command signals that generate, for components of each superposition vector, corresponding signals representing components of a numeric entanglement vector.

Each component referred to a respective vector of the second basis may be equal to the corresponding component of the respective superposition vector if the binary function is null in correspondence to the vector of the first basis formed by the first n qubits of the respective vector of the second basis; or the opposite of the corresponding component of the respective superposition vector if the binary function is not a null in correspondence to the vector of the first basis formed by the first n qubits of the respective vector of the second basis.

BRIEF DESCRIPTION OF THE DRAWINGS

The particular aspects and advantages of the invention will become more evident through the following description of several important embodiments and by referring to the attached drawings, wherein.

DETAILED DESCRIPTION OF THE PREFERRED EMBODIMENTS

The quantum gate of the invention is suitable for fast running decision making or data search routines based on a Deutsch-Jozsa's or a Grover's quantum algorithm applied over a set of input vectors. The quantum gate of a superposition subsystem carrying out a linear superposition, an entanglement subsystem carrying out an entanglement operation and an interference subsystem carrying out an interference operation according to a Grover's or a Deutsch-Jozsa's quantum algorithm.

An essential characteristic of the quantum gate of the invention includes the fact that the entanglement subsystem does not multiply a superposition vector for the entanglement matrix $U_F$, but generates components of an entanglement vector simply by copying or inverting respective components of the superposition vector depending on values of the function f(.).

This allows a relevant reduction of the number of multiplications with respect to known methods, and can be carried out with logic gates or multiplexers. For this reason, the quantum gate of the invention may be conveniently used for running decision making algorithms or data search routines in large databases in a very fast manner.

To show how the calculation of an entanglement vector can be speeded up by the method of the invention, an example of quantum search algorithm in which each vector is composed of two qubits is given. The present invention supports the extension to vectors of more than two qubits, as readily appreciated by those skilled in the art.

Figure 1:
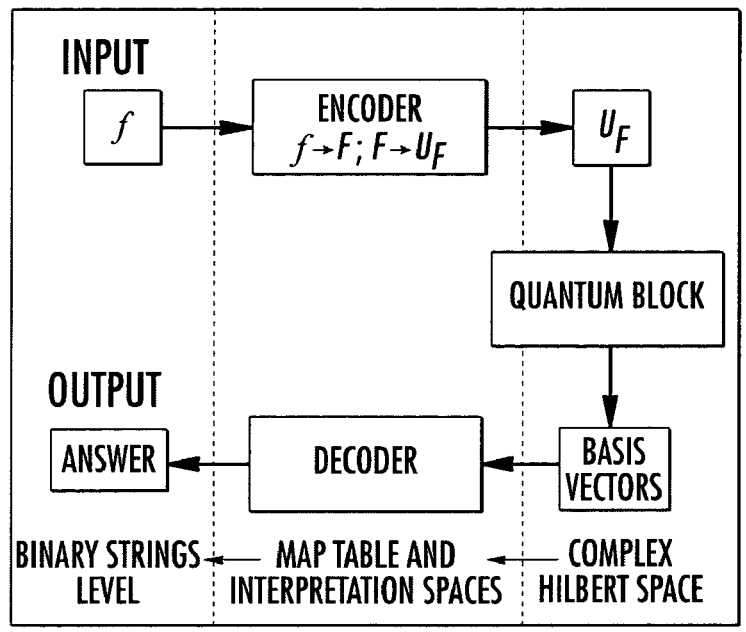
FIG. 1 is a block diagram of a quantum algorithm in accordance with the prior art.
Figure 2:
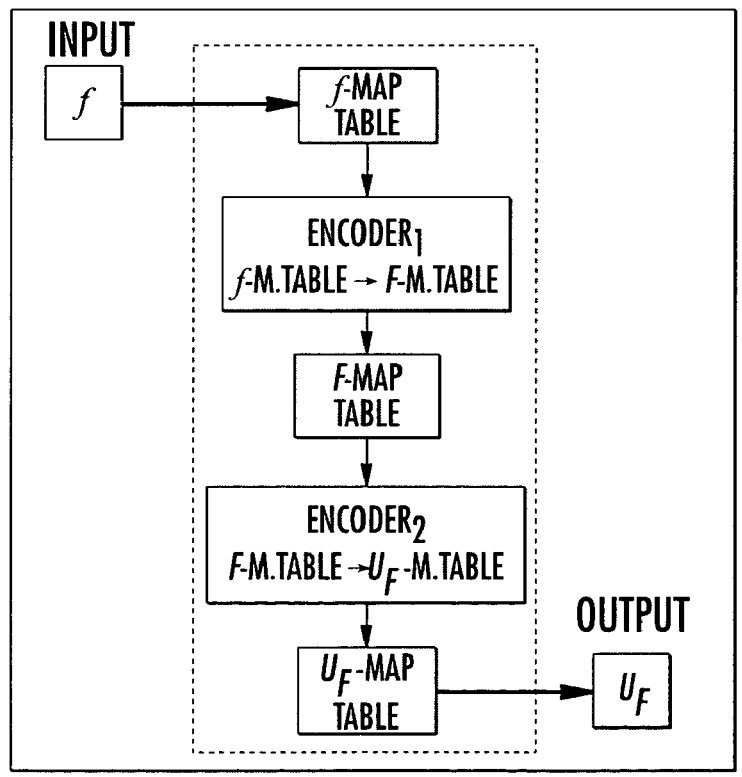
FIG. 2 is a block diagram of an encoder in accordance with the prior art.
Figure 3:
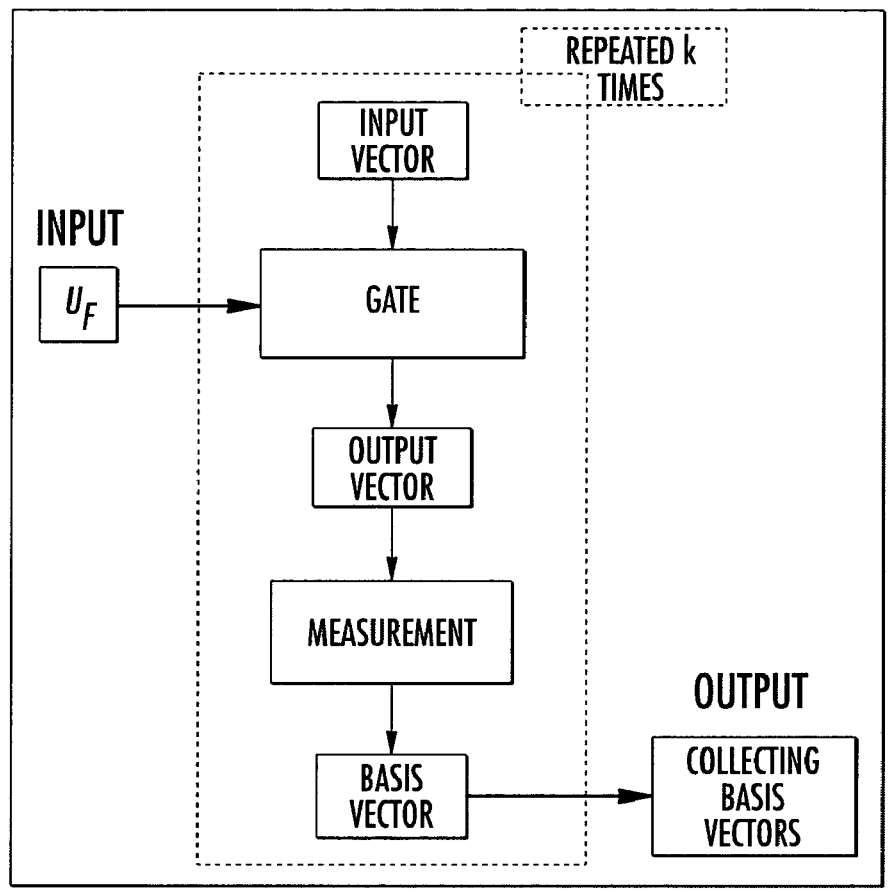
FIG. 3 is a general structure of the block diagram illustrated in FIG. 1.
Figure 4:
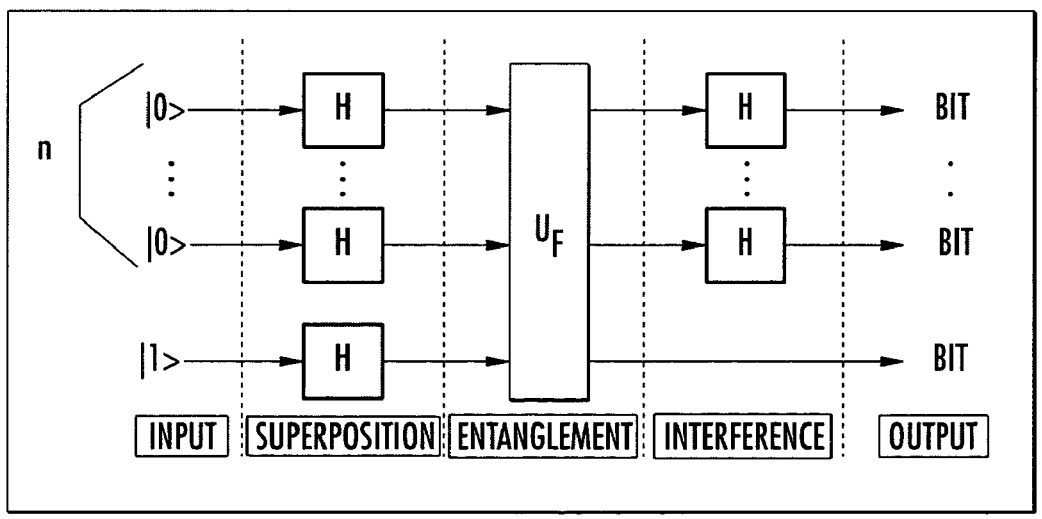
FIG. 4 is a circuit for a Deutsch-Jozsa's quantum gate in accordance with the prior art.
Figure 5A:
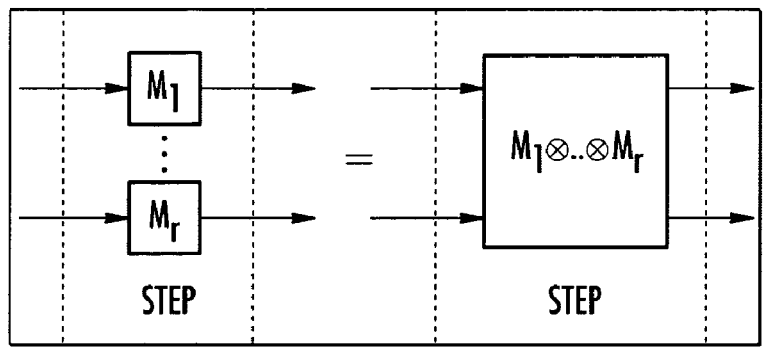
FIG. 5a shows an example of a tensor product transformation in accordance with the prior art.
Figure 5B:
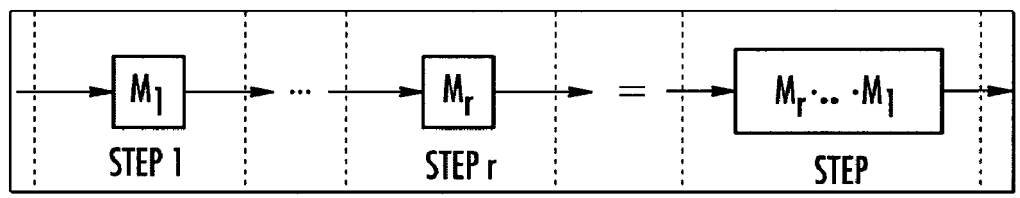
FIG. 5b shows an example of a dot product transformation in accordance with the prior art.
Figure 5C:
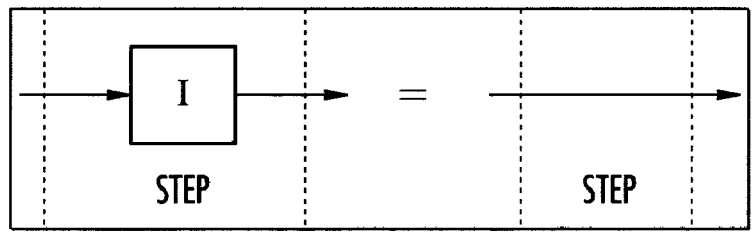
FIG. 5c shows the identity transformation in accordance with the prior art.
Figure 5D:
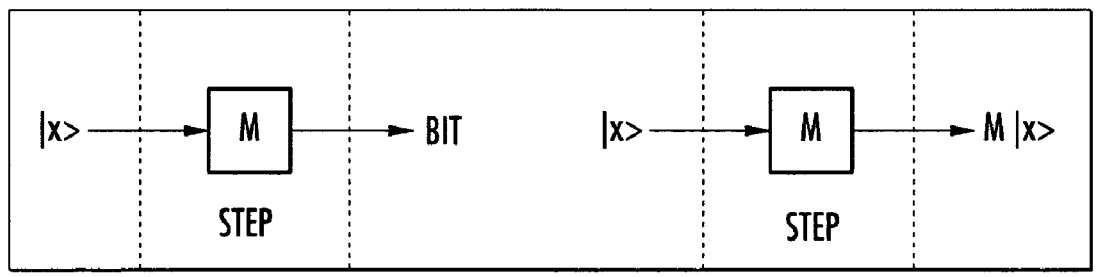
FIG. 5d shows an example of the propagation rule in accordance with the prior art.
Figure 5E:
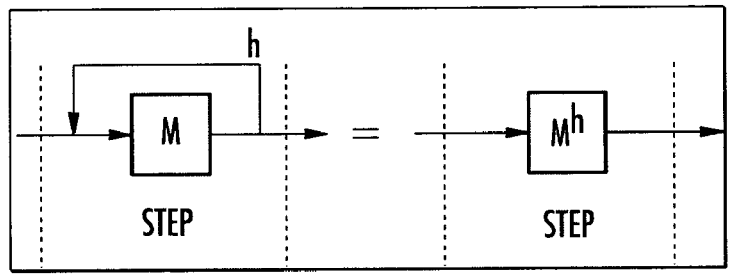
FIG. 5e shows an example of the iteration rule in accordance with the prior art.
Figure 5F:
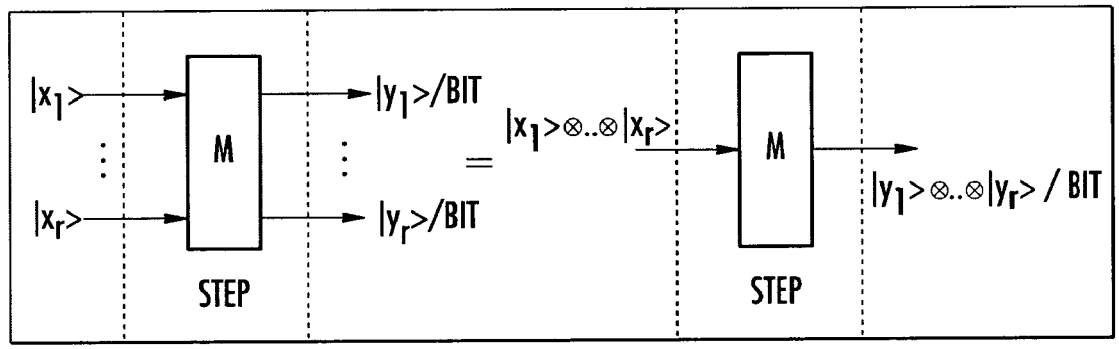
FIG. 5f explains the input/output tensor rule in accordance with the prior art.
Figure 6:
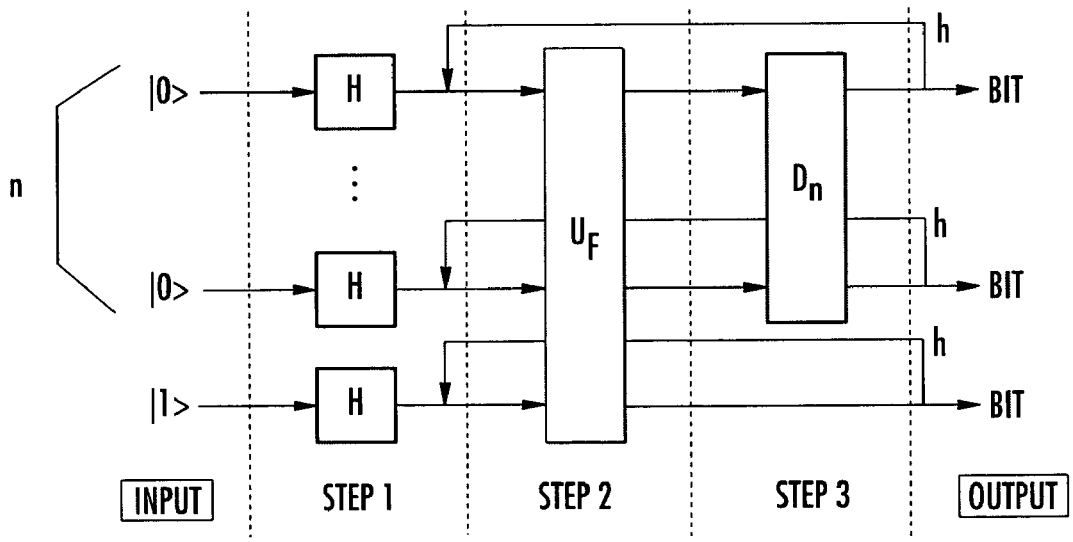
FIG. 6 is an example of a circuit forming a Grover's quantum gate in accordance with the prior art.
Figure 7:
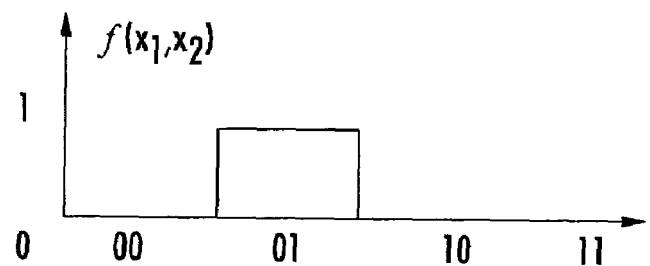
FIG. 7 is a graph of a function to be processed by a Grover's quantum algorithm in accordance with the present invention.

Let us consider a function f: $\{0,1\}^2 \rightarrow \{0,1\}$ having the following definition law:

$$\begin{cases} f(01) = 1 \\ f(.) = 0 \text{ elsewhere} \end{cases} \quad (7)$$

whose diagram is depicted in FIG. 7. According to known methods, this function should be translated into a function F: $\{0,1\}^3 \rightarrow \{0,1\}^3$ and, therefore into the matrix $U_F$:

$$U_F = \begin{bmatrix} I & 0 & 0 & 0 \\ 0 & C & 0 & 0 \\ 0 & 0 & I & 0 \\ 0 & 0 & 0 & I \end{bmatrix} \quad (8)$$

where $$I = \begin{bmatrix} 1 & 0 \\ 0 & 1 \end{bmatrix} \quad C = \begin{bmatrix} 0 & 1 \\ 1 & 0 \end{bmatrix} \quad (9)$$

The following linear superposition will now be considered:

$$Y^* = \begin{bmatrix} \frac{1}{2\sqrt{2}} & -\frac{1}{2\sqrt{2}} & \frac{1}{2\sqrt{2}} & -\frac{1}{2\sqrt{2}} & \frac{1}{2\sqrt{2}} & -\frac{1}{2\sqrt{2}} & \frac{1}{2\sqrt{2}} & -\frac{1}{2\sqrt{2}} \end{bmatrix}^T \quad (10)$$

Known methods contemplate generating components of the corresponding entanglement vector G*:

$$G^* = \begin{bmatrix} \frac{1}{2\sqrt{2}} & -\frac{1}{2\sqrt{2}} & -\frac{1}{2\sqrt{2}} & \frac{1}{2\sqrt{2}} & \frac{1}{2\sqrt{2}} & -\frac{1}{2\sqrt{2}} & \frac{1}{2\sqrt{2}} & -\frac{1}{2\sqrt{2}} \end{bmatrix}^T \quad (11)$$

by calculating the product $G^* = U_F \cdot Y^*$, which implies many (64) multiplications.

According to the method of the invention, the components of the vector G* are more easily obtained by copying or inverting the corresponding components of Y*, depending on the values assumed by the function f(.). More precisely, all components of vector G* but the third and the fourth are equal to the corresponding components of Y* because the function f(.) is 0 for vectors |00>, |10> and |11>, while the third and the fourth components of G* are obtained by inverting the corresponding components of Y* because f(.) is 1 for vector |01>. As a consequence, the entanglement operation of Deutsch-Jozsa's or Grover's quantum algorithms can be implemented in straightforward and fast quantum gates.

Figure 8:
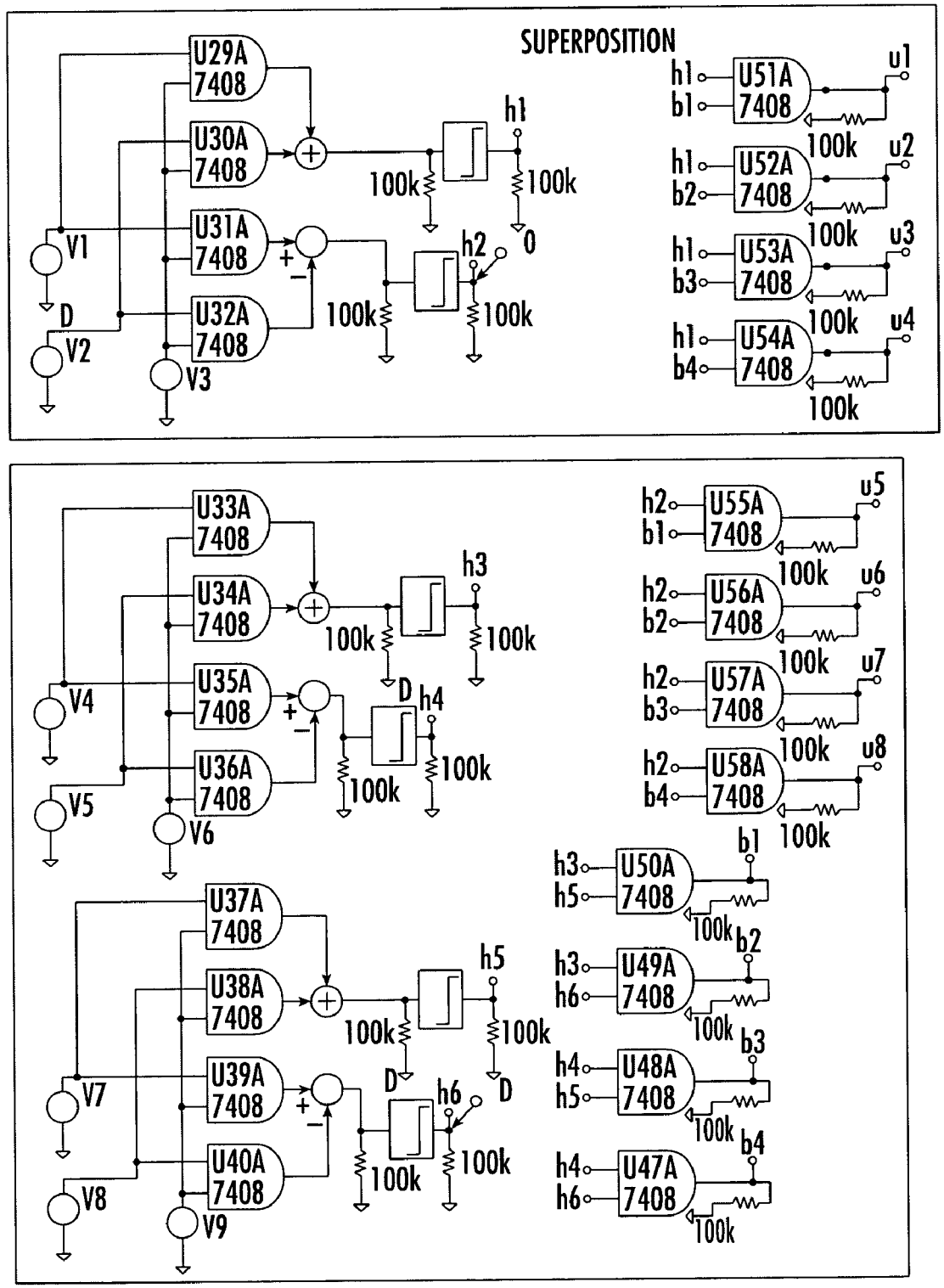
FIG. 8 is a detailed view of a superposition subsystem of the quantum gate in accordance with the present invention for a Grover's algorithm with one iteration.
Figure 10:
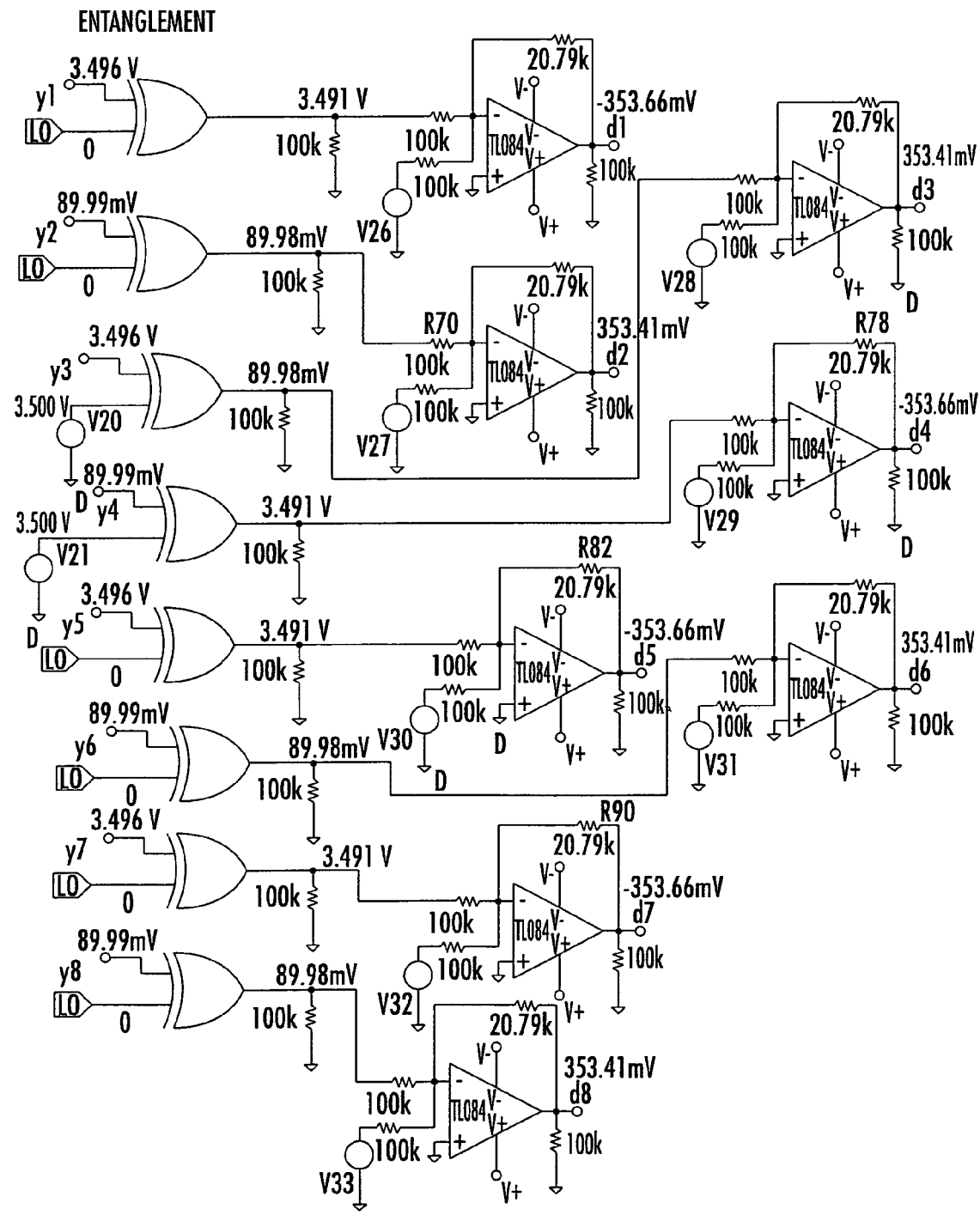
FIG. 10 is a detailed view of the entanglement subsystem of the quantum gate in accordance with the present invention for a Grover's algorithm with one iteration.
Figure 11:
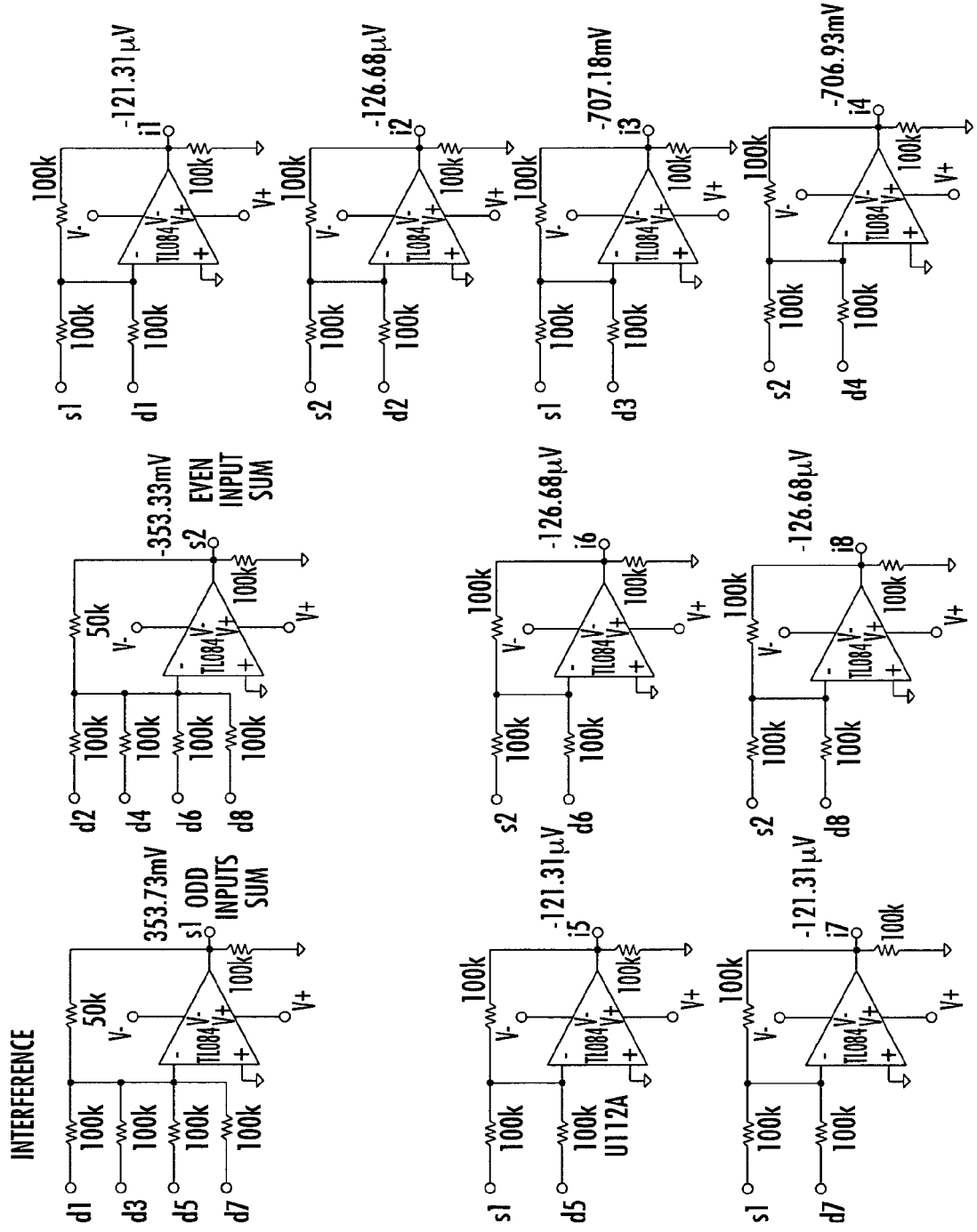
FIG. 11 is a detailed view of the interference subsystem of the quantum gate in accordance with the present invention for a Grover's algorithm with one iteration.

A particular quantum gate of the invention, especially designed for carrying out the Deutsch-Jozsa's quantum algorithm or the Grover's algorithm with only one iteration (h=1), is depicted in FIGS. 8, 10 and 11. This quantum gate has a superposition subsystem, which can be as depicted in FIG. 8 and as disclosed in the above referenced European patent application EP01830383.4. The quantum gate further includes an entanglement subsystem made of logic gates and operational amplifiers, and an interference subsystem.

This particular embodiment of a quantum gate exploits the fact that the vector Y* can be encoded by using the transformation:

$$Y = \frac{1}{2y} \cdot (Y^* + [y \ldots y]^T) \quad (12)$$

where $$y = \frac{1}{2\sqrt{2}}$$

in the following encoded superposition vector:

$$Y = [10101010]^T \quad (13)$$

It is easy to demonstrate that the vector G that encodes the entanglement vector $G^* = U_F \cdot Y^*$ according to the cited transformation (equation 12)

$$G = \frac{1}{2y} \cdot (G^* + [y \ldots y]^T) \quad (14)$$

is $G = U_F \cdot Y$. Therefore, components $g_i$ of the encoded entanglement vector G can be obtained, according to the method of the invention, by copying or inverting the corresponding components $y_i$ of the encoded superposition vector Y, depending on the values of function f(.). For the considered example, the encoded entanglement vector G is $$G = [10011010]^T \qquad (15)$$

which corresponds to the numeric entanglement vector given by equation 11.

Figure 9:
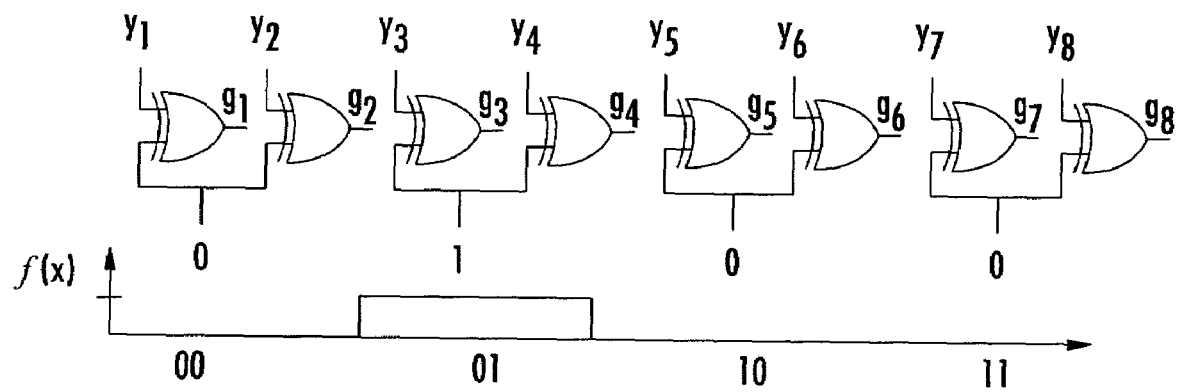
FIG. 9 depicts the logic part of the entanglement subsystem of a quantum gate in accordance with the present invention for the function illustrated in FIG. 7.

An example of a logic circuit for carrying out the entanglement operation of a Grover's or Deutsch-Jozsa's algorithm is depicted in FIG. 9. Each logic gate XORs a component of the encoded superposition vector $y_i$ with a corresponding value of the function f(.) for generating a corresponding component $g_i$ of encoded entanglement vector. Each component $y_i$ that is not a null is represented by a voltage of 3.5V, while each null component is represented by a null voltage.

The components of the encoded entanglement vector are then converted in corresponding components d1, ..., d8 of a numeric entanglement vector by an array of digital/analog converters, depicted in FIG. 10. Each converter includes an adder that inverts the transformation given by equation 14. The output voltages d1, ... d8 of the operational amplifiers are about ±0.3535 Volts, which corresponds to a numeric value of $$\pm \frac{1}{2\sqrt{2}}.$$

A more difficult task is to deal with the interference operation of a Grover's algorithm. In fact, differently from the entanglement operation, vectors generated by the interference operation are not composed by elements having only two possible values. Moreover, the presence of tensor products, whose number increases dramatically with the dimensions, forms a critical point at this step.

It is possible to quickly carry out the interference operation of a Grover's quantum algorithm. The matrix $D_n \otimes I$ has the following properties:
- odd columns (or rows, because $D_n \otimes I$ is symmetric) have non-zero odd components and even columns have non-zero even components;
- the value of all non-zero components, but the $i^{th}$ component of $i^{th}$ column (diagonal elements) is $\frac{1}{2}^{n-1}$. The components on the up-left down-right diagonal of the matrix differ from the other non-zero components because they are decreased by 1; and
- since G* is the numeric entanglement vector, the output vector of the quantum algorithm $V = (D_n \otimes I) G^*$ involves only a suitable weighted sum of components of G*, with the value $\frac{1}{2}^{n-1}$ depending only from the number n of qubits.

From the above analysis, the generic element $v_i$ of V can be written as follows as a function of $g^*_i$:

$$v_i = \begin{cases} \frac{1}{2^{n-1}} \sum_{j=1}^{2^n} g^*_{2j-1} - g^*_i & \text{for } i \text{ odd} \\ \frac{1}{2^{n-1}} \sum_{j=1}^{2^n} g^*_{2j} - g^*_i & \text{for } i \text{ even} \end{cases} \qquad (16)$$

Therefore, in order to calculate a component $v_i$ of the output vector it is sufficient to calculate a weighted sum of even $$\left( \frac{1}{2^{n-1}} \sum_{j=1}^{2^n} g^*_{2j} \right)$$

or odd $$\left( \frac{1}{2^{n-1}} \sum_{j=1}^{2^n} g^*_{2j-1} \right)$$

components of the numeric entanglement vector, and to subtract from it the corresponding component $g^*_i$ of the numeric entanglement vector.

According to the above formulas, the pre-interference sum block of the interference subsystem depicted in FIG. 11 has adders generating voltage signals representing scaled sums of odd (s1) and even (s2) components with a scale factor of $\frac{1}{2}^{n-1}$ (0.5 in this case). The interference subsystem further comprises an array of adders input with a voltage representing a component of the numeric entanglement vector (d1, ..., d8) and with a respective scaled sum (s1 or s2) for generating voltages representing components (i1, ..., i8) of the output vector.

When the Grover's algorithm terminates, only two of them (i3, i4) may assume values close to $$\pm \frac{1}{\sqrt{2}} = \pm 0.7071067,$$

denoting the position of the searched element. With the same entanglement as in the previous section, third and fourth OPAMPs (i3 and i4) must have non-zero values. This fact is confirmed by the PSPICE simulation depicted in FIG. 11 (707 mV against 0.1 mV of other outputs).

As evident to one skilled in the art, the computational speed is significantly increased because of a smaller number of products (only one for each element of the output vector), and more precisely $2^{n+1}$ against $4^{n+1}$ of traditional approaches. Even the number of additions has been reduced ($2^n(2^n+1)$ instead of $4^{n+1}$). But the most important fact is that all these operations can be easily carried out via hardware with few operational amplifiers ($2^n+2$). Moreover, if n is the number of qubits (in the considered example n=2), this embodiment of a quantum gate of the invention calculates only $2^{n+1}$ products (8) instead of $2^{2n+2}$ (64) required in prior art methods, thus noticeably reducing the time required for carrying out the entanglement operation.

It is not necessary to calculate all the components of the entanglement or output vector because the odd components of any vector are always opposite the even components, and it is possible to infer looking at signals d1, d3, d5, d7 and i1, i3, i5, i7. Therefore, it is clear that the number of logic gates or adders in FIGS. 10 and 11 could have been halved simply by carrying out the entanglement and interference operations only on the odd or even components, and by calculating the other components by inverting the first ones.

That which is claimed is:

1. A method of operating a quantum gate running a Grover's quantum algorithm, the method comprising:
   receiving at an input of the quantum gate a binary function having a basis of vectors of n qubits;
   carrying out a superposition operation using a superposition subsystem coupled to the input, the superposition operation being carried out on input vectors for generating components of linear superposition vectors based upon a second basis of vectors of n+1 qubits;
   carrying out an entanglement operation using an entanglement subsystem coupled to the superposition subsystem, the entanglement operation being carried out on components of the linear superposition vectors for generating components of numeric entanglement vectors, the entanglement operation generating, for components of each superposition vector, corresponding components of a numeric entanglement vector, each component based upon a respective vector of the second basis and being equal to one of the following
      the corresponding component of the respective superposition vector if the binary function is null based upon the vector of the first basis formed by the first n qubits of the respective vector of the second basis, and
      the opposite of the corresponding component of the respective superposition vector if the binary function is not a null; and
   carrying out an interference operation using an interference subsystem coupled to the entanglement subsystem, the interface operation being carried out on components of the numeric entanglement vectors for generating components of output vectors.

2. A method according to claim 1, wherein the components of each output vector are even components, and odd components of each output vector are obtained by inverting the even components.

3. A method according to claim 1, wherein the components of each output vector are odd components, and even components of each output vectors are obtained by inverting the odd components.

4. A method according to claim 1, wherein even or odd components of a numeric entanglement vector are obtained by carrying out the following operations:
   encoding components of each linear superposition vector with a low logic value if negative and with a high logic value if positive for generating components of encoded superposition vectors;
   generating for components of each encoded superposition vector corresponding components of an encoded entanglement vector, each component based upon a respective vector of the second basis and being obtained by
      copying the corresponding component of the respective encoded superposition vector if the binary function is null in correspondence to the vector of the first basis formed by the first n qubits of the respective vector of the second basis, or
      logically inverting the corresponding component of the respective encoded superposition vector if the binary function is not a null; and
   decoding the components of encoded entanglement vectors for generating the components of numeric entanglement vectors.

5. A method according to claim 4, wherein each of the components of an encoded entanglement vector is obtained by XORing the corresponding component of the encoded superposition vector with a value of the binary function corresponding to the vector of the first basis formed by the first n qubits.

6. A method according to claim 1, wherein the interference operation comprises:
   calculating a weighed sum with a scale factor of even or odd components of a numeric entanglement vector; and
   generating each even or odd component of an output vector by respectively subtracting a corresponding even or odd component of a numeric entanglement vector from the weighed sum.

7. A method of operating a quantum gate running a Deutsch-Jozsa's quantum algorithm, the method comprising:
   receiving at an input of the quantum gate a binary function having a basis of vectors of n gubits;
   carrying out a superposition operation using a superposition subsystem coupled to the input, the superposition operation being carried out on input vectors for generating components of linear superposition vectors based upon a second basis of vectors of n+1 qubits;
   carrying out an entanglement operation using an entanglement subsystem coupled to the superposition subsystem, the entanglement operation being carried out on components of the linear superposition vectors for generating components of numeric entanglement vectors, the entanglement operation generating, for components of each superposition vector, corresponding components of a numeric entanglement vector, each component based upon a respective vector of the second basis and being equal to one of the following
      the corresponding component of the respective superposition vector if the binary function is null based upon the vector of the first basis formed by the first n qubits of the respective vector of the second basis, and
      the opposite of the corresponding component of the respective superposition vector if the binary function is not a null; and
   carrying out an interference operation using an interference subsystem coupled to the entanglement subsystem, the interface operation being carried out on components of the numeric entanglement vectors for generating components of output vectors.

8. A method according to claim 7, wherein the components of each output vector are even components, and odd components of each output vector are obtained by inverting the even components.

9. A method according to claim 7, wherein the components of each output vector are odd components, and even components of each output vectors are obtained by inverting the odd components.

10. A method according to claim 7, wherein even or odd components of a numeric entanglement vector are obtained by carrying out the following operations:
    encoding components of each linear superposition vector with a low logic value if negative and with a high logic value if positive for generating components of encoded superposition vectors;
    generating for components of each encoded superposition vector corresponding components of an encoded entanglement vector, each component based upon a respective vector of the second basis and being obtained by
       copying the corresponding component of the respective encoded superposition vector if the binary function is null in correspondence to the vector of the first basis formed by the first n qubits of the respective vector of the second basis, or logically inverting the corresponding component of the respective encoded superposition vector if the binary function is not a null,!and decoding the components of encoded entanglement vectors for generating the components of numeric entanglement vectors.

11. A method according to claim 10, wherein each of the components of an encoded entanglement vector is obtained by XORing the corresponding component of the encoded superposition vector with a value of the binary function corresponding to the vector of the first basis formed by the first n qubits.

12. A quantum gate for running a Grover's quantum algorithm and comprising:

an input for receiving a binary function having a basis of vectors of n qubits;

a superposition subsystem connected to the input for carrying out a superposition operation on components of input vectors for generating components of linear superposition vectors based upon a second basis of vectors of n+1 qubits;

an entanglement subsystem connected to said superposition subsystem for carrying out an entanglement operation on components of the linear superposition vectors for generating components of numeric entanglement vectors, said entanglement subsystem comprising a command circuit generating a plurality of logic command signals encoding values of the binary function corresponding to the vectors of the first basis, and circuit means being input with the logic command signals and generating for components of each superposition vector corresponding signals representing components of a numeric entanglement vector, each component referred to a respective vector of the second basis is equal to at least one of the following the corresponding component of the respective superposition vector if the binary function is null in correspondence to the vector of the first basis formed by the first n qubits of the respective vector of the second basis, and the opposite of the corresponding component of the respective superposition vector if the binary function is not a null; and an interference subsystem connected to said entanglement subsystem for carrying out an interference operation on components of the numeric entanglement vectors for generating components of output vectors.

13. A quantum gate according to claim 12, wherein said circuit means encodes components of each linear superposition vector with a low logic value if negative and with a high logic value if positive for generating signals representing components of an encoded superposition vector, said circuit means comprising:

an array of XOR logic gates each input with a signal representing a component of an encoded superposition vector, and with a relative logic command signal for generating voltage signals representing components of encoded entanglement vectors; and an array of digital/analog converters that decodes components of the encoded entanglement vectors for generating signals representing corresponding components of numeric entanglement vectors.

14. A quantum gate according to claim 13, wherein each digital/analog converter outputs a signal representing the weighed difference with a second scale factor between the component of encoded entanglement vectors and a reference value.

15. A quantum gate according to claim 12, wherein said interference subsystem comprises:

an adder being input with voltage signals representing even or odd components of a numeric entanglement vector, and generating a summed signal representing a weighed sum with a scale factor of the even or odd components; and an array of adders each being input with a respective signal representing an even or odd component, respectively, of a numeric entanglement vector and with the summed signal for generating a signal representing an even or odd component, respectively, of the output vector as the difference between the summed signal and the signal representing an even or odd component of a numeric entanglement vector.

16. A quantum gate for running a Deutsch-Jozsa's quantum algorithm and comprising:

an input receiving a binary function having a basis of vectors of n qubits;

a superposition subsystem connected to the input for carrying out a superposition operation on components of input vectors for generating components of linear superposition vectors based upon a second basis of vectors of n+1 qubits;

an entanglement subsystem connected to said superposition subsystem for carrying out an entanglement operation on components of the linear superposition vectors for generating components of numeric entanglement vectors, said entanglement subsystem comprising a command circuit generating a plurality of logic command signals encoding values of the binary function corresponding to the vectors of the first basis, and a circuit being input with the logic command signals and generating for components of each superposition vector corresponding signals representing components of a numeric entanglement vector, each component referred to a respective vector of the second basis is equal to at least one of the following the corresponding component of the respective superposition vector if the binary function is null in correspondence to the vector of the first basis formed by the first n qubits of the respective vector of the second basis, and the opposite of the corresponding component of the respective superposition vector if the binary function is not a null; and an interference subsystem connected to said entanglement subsystem for carrying out an interference operation on components of the numeric entanglement vectors for generating components of output vectors.

17. A quantum gate according to claim 16, wherein said circuit encodes components of each linear superposition vector with a low logic value if negative and with a high logic value if positive for generating signals representing components of an encoded superposition vector, said circuit comprising:

an array of XOR logic gates each input with a signal representing a component of an encoded superposition vector, and with a relative logic command signal for generating voltage signals representing components of encoded entanglement vectors; and an array of digital/analog converters that decodes components of the encoded entanglement vectors for generating signals representing corresponding components of numeric entanglement vectors.

18. A quantum gate according to claim 17, wherein each digital/analog converter outputs a signal representing the weighed difference with a second scale factor between the component of encoded entanglement vectors and a reference value.

* * * * *

UNITED STATES PATENT AND TRADEMARK OFFICE
CERTIFICATE OF CORRECTION

PATENT NO. : 7,203,715 B2  Page 1 of 1
APPLICATION NO. : 10/615446
DATED : April 10, 2007
INVENTOR(S) : Rizzotto et al.

It is certified that error appears in the above-identified patent and that said Letters Patent is hereby corrected as shown below:

| | |
|---|---|
| Column 2, Line 31 | Delete: "infective"<br>Insert -- injective -- |
| Column 2, Line 55 | Delete: "infective"<br>Insert -- injective -- |
| Column 4, Line 41 | Delete: "are listed"<br>Insert -- listed -- |
| Column 14, Line 16 | Delete: "gubits"<br>Insert -- qubits -- |
| Column 15, Line 6 | Delete: ",! "<br>Insert -- ; -- |

Signed and Sealed this

Seventh Day of August, 2007

JON W. DUDAS
*Director of the United States Patent and Trademark Office*